W. H. SPIRE.
WELDING MACHINE.
APPLICATION FILED JAN. 31, 1917.

1,228,843.

Patented June 5, 1917.
3 SHEETS—SHEET 1.

W. H. SPIRE.
WELDING MACHINE.
APPLICATION FILED JAN. 31, 1917.

1,228,843.

Patented June 5, 1917.
3 SHEETS—SHEET 3.

Inventor:
William H. Spire
by Merkel and Saywell
his Attorneys.

UNITED STATES PATENT OFFICE.

WILLIAM H. SPIRE, OF CLEVELAND, OHIO, ASSIGNOR TO THE STEEL PRODUCTS COMPANY, OF CLEVELAND, OHIO, A CORPORATION OF OHIO.

WELDING-MACHINE.

1,228,843.     Specification of Letters Patent.     Patented June 5, 1917.

Application filed January 31, 1917. Serial No. 145,769.

*To all whom it may concern:*

Be it known that I, WILLIAM H. SPIRE, a citizen of the United States, resident of Cleveland, county of Cuyahoga, and State of Ohio, have invented new and useful Improvements in Welding-Machines, of which the following is a specification, the principle of the invention being herein explained and the best mode in which I have contemplated applying that principle, so as to distinguish it from other inventions.

My invention relates to apparatus for welding by electricity and has for its particular objects the provision of means whereby a platen longitudinally movable of the frame of the apparatus may be supported on and movable over a plurality of sets of bearing rolls in order to effect such longitudinal movement; means for adjusting such platen and a movable welding head carried thereon both vertically and transversely of the frame; and further means providing for the escape of incandescent particles flying from the welding area without the same falling upon surfaces which are liable to be injured by such hot particles.

The annexed drawings and the following description set forth in detail certain means embodying my invention, the disclosed means, however, constituting but one of various mechanical forms in which the principle of the invention may be employed.

Figure 1:
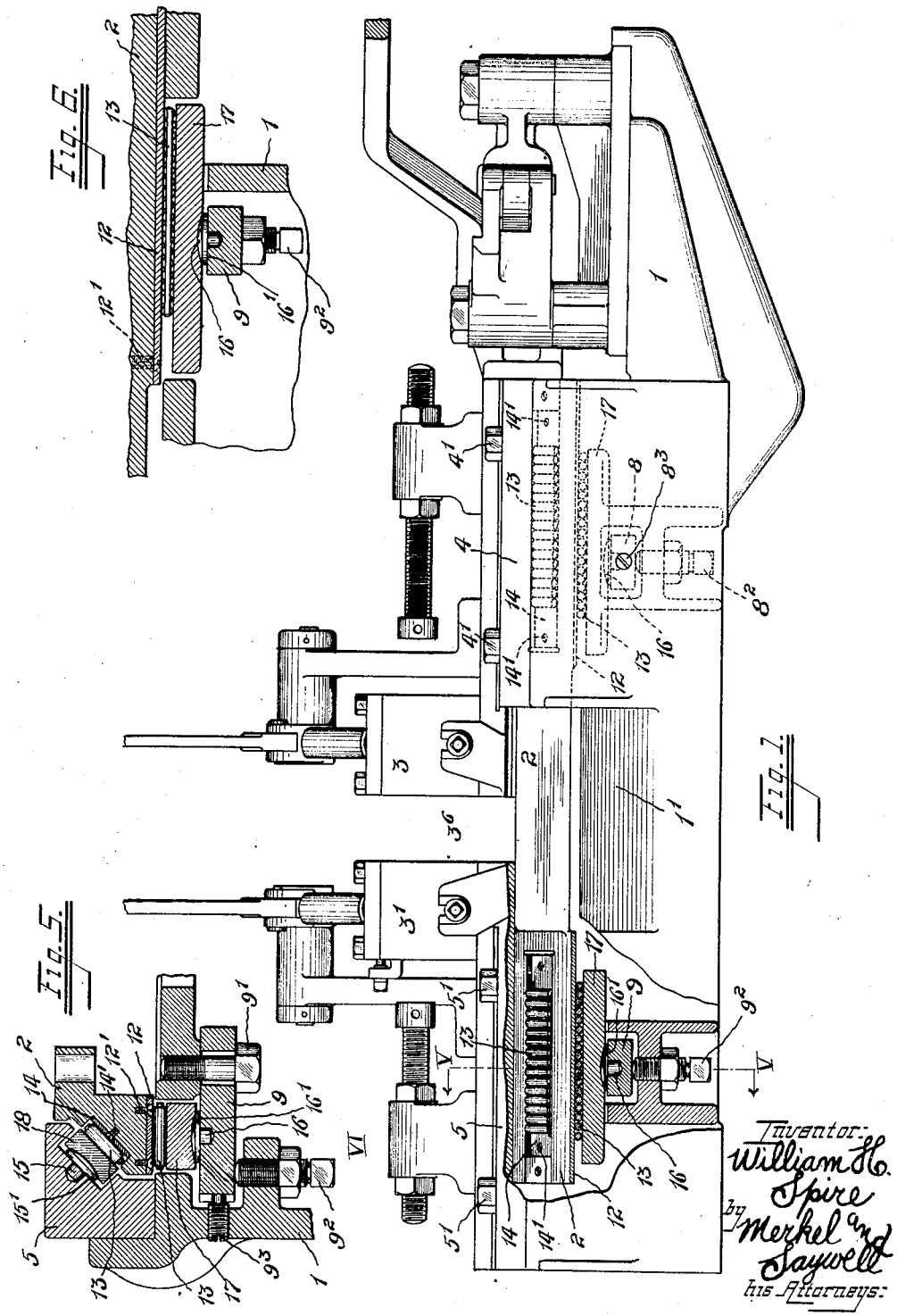
Figure 2:
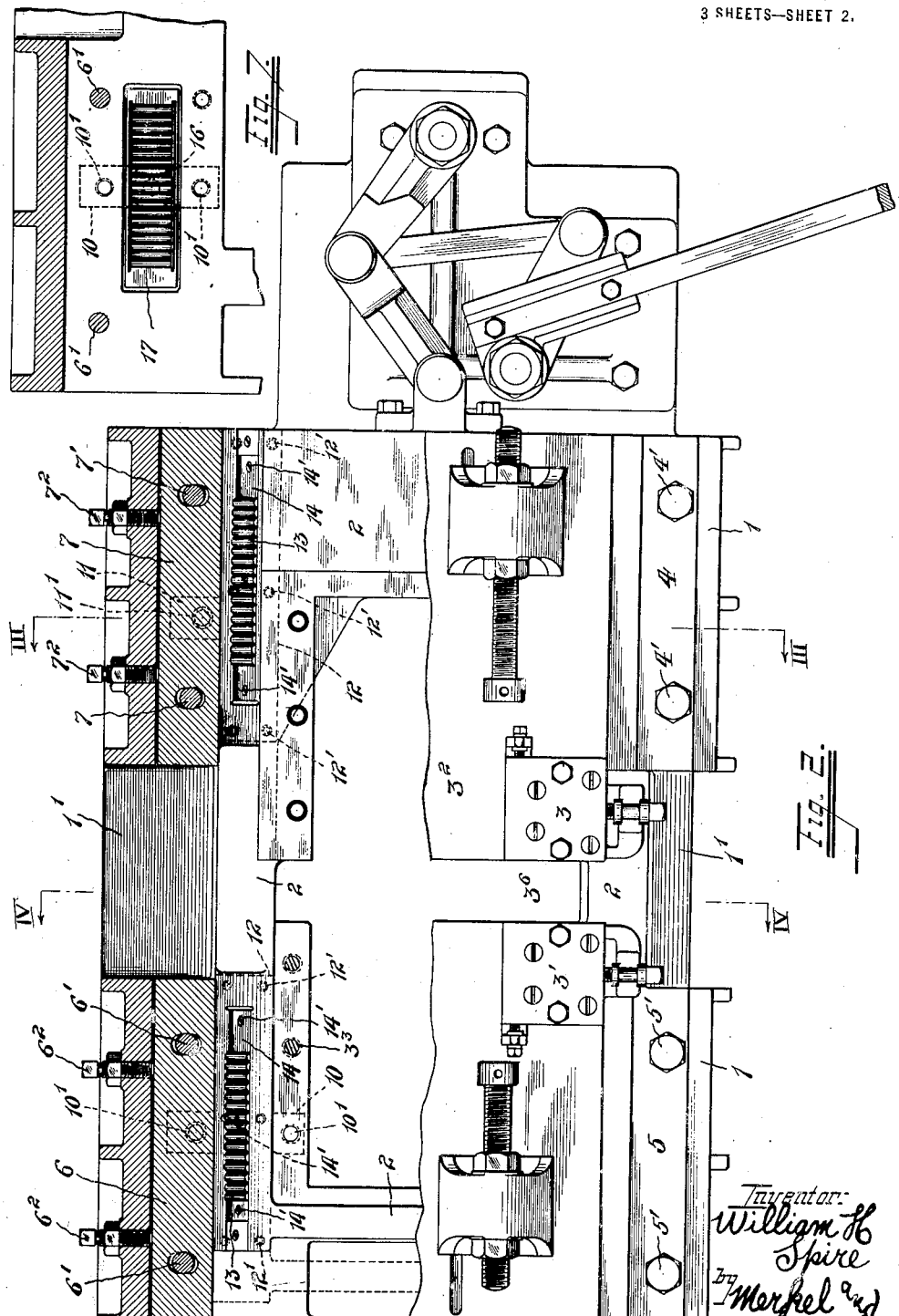
Figure 3:
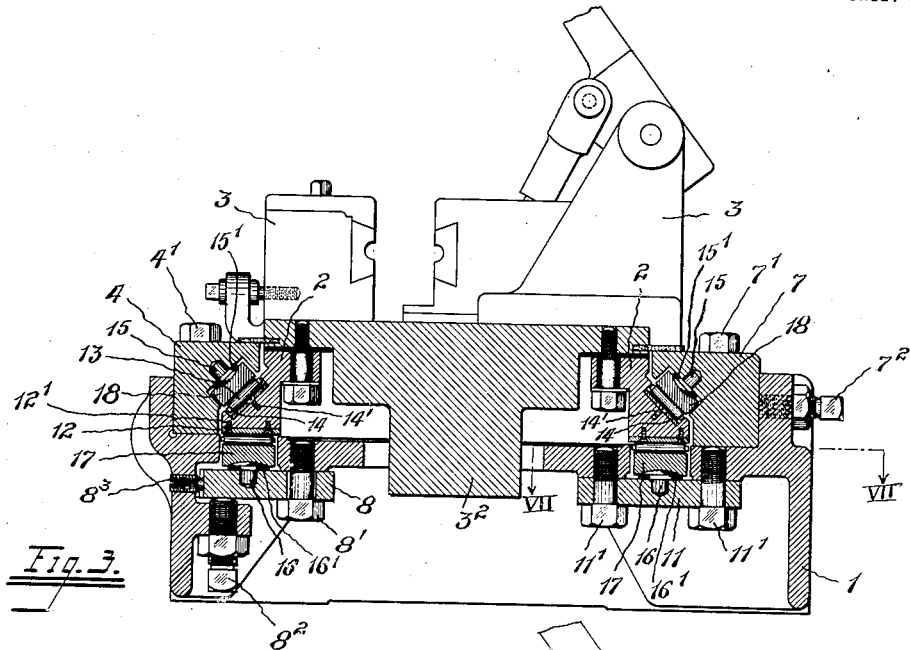
Figure 4:
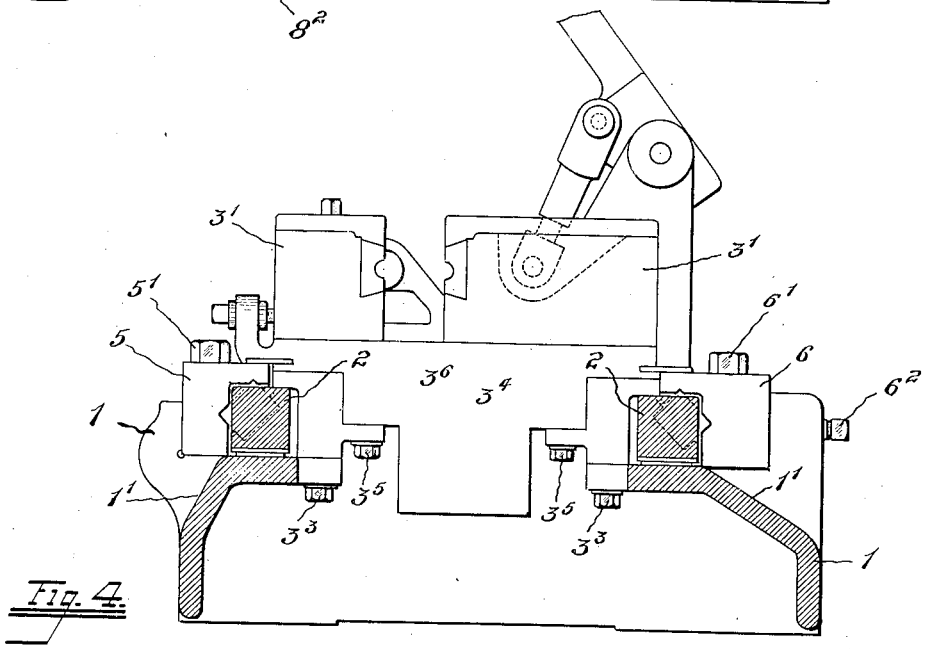

In said annexed drawings:

Figure 1 represents a side elevation of a machine embodying my invention, partially in vertical section; Fig. 2 represents a plan view thereof, partially in horizontal section; Figs. 3 and 4 represent transverse vertical sections taken in the planes indicated by the lines III—III and IV—IV, respectively, Fig. 2; Fig. 5 represents a transverse vertical section on an enlarged scale taken upon the line V—V, Fig. 1, Fig. 6 represents an enlarged view of some of the details shown in section in Fig. 1; and Fig. 7 represents a longitudinal horizontal section taken in the plane indicated by the line VII—VII, Fig. 3.

Various mechanisms, old and well-known in this art, are provided in connection with my new and improved machine, and such mechanisms are shown in connection with my said improved machine in so far as is necessary to plainly indicate the connection thereof with my said improvements. Such mechanisms comprise a main frame 1, upon which is supported a longitudinally movable platen 2, a part of my present invention and hereinafter more fully described, said platen supporting a front solid frame member $3^2$ upon which is supported a movable welding head 3. A fixed welding head $3'$ is secured to the main frame 1 by machine screws $3^3$, $3^3$, Fig. 4, and also to rear solid frame member $3^4$ by machine screws $3^5$, $3^5$. Between said solid members $3^2$ and $3^4$ is a transverse central aperture $3^6$ extending vertically through the machine as plainly shown in Fig. 2. The welding heads 3 and $3'$ are each connected with the terminals (not shown) of the secondary coil of a transformer such as is usually used in this class of devices and the structure and operation of which are well known to those skilled in the art. As in other machines of this class, the two elements which are to be welded together are clamped respectively in the welding heads, whereupon the reciprocable member is moved toward the stationary member until contact and sufficient pressure are established to enable a welding current passing across the gap to effect the required weld.

The platen 2 extends substantially the full length of the main frame 1 so as to extend a considerable distance under the welding head $3'$, as plainly shown in Fig. 2, whereby it will be seen that the movable welding head 3 has an extremely long bearing on the frame and as a consequence its deviation from a straight line during its longitudinal travel is reduced to a minimum and the desired registration of the two members to be welded thereby repeatedly obtained after the two heads have been properly alined to effect such registration. Means which have for their object such proper above-mentioned alinement of the welding heads, that is, the proper alinement of the clamping jaws which hold the two members to be welded comprise features of the present improvements and will now be described.

Such improved mechanism, in addition to the movable platen 2 hereinbefore mentioned, includes in coöperation with the old and well-known devices hereinbefore mentioned, a pair of adjusting guide blocks 6 and 7, and a pair of fixed guide blocks 4 and 5 contained within the four corners of the rectangular frame 1 by the pairs of set screws 4', 5', 6' and 7', as plainly shown in Fig. 2, the two blocks 6 and 7 being horizontally adjustable transversely of said frame 1, by means of the two pairs of adjusting screws 6² and 7², as plainly shown in said Fig. 2, the screw holes of the screws 6' and 7' being enlarged to allow for this adjustment. Secured to the bottom of the main frame 1 approximately in the four corners thereof, are four race supports 8, 9, 10 and 11, as plainly shown in Figs. 1 and 3, two of said supports 8 and 9 being vertically adjustable by means of the adjusting screws 8² and 9², the connection of said supports to the frame 1 otherwise being by means of the set screws 8', 9', 10' and 11', a pair of said screws being provided for the fixed supports 10 and 11 and one of said screws in combination with the adjusting screws 8² and 9² being provided for the adjustable members 8 and 9, the screw holes for said screws 8' and 9' being enlarged. Platen 2 is transversely movable relatively to said supports 8, 9, 10 and 11, by means of the intermediate mechanisms next to be described, said mechanisms comprising two series of bearing races, one lower and one upper, 17 and 18, respectively, two series of bearing rolls 13 of four sets each, and upper and lower series of bearing race plates 14 and 12, all connected as will now be described in detail. The lower bearing races 17 are supported upon the race supports 8, 9, 10 and 11 by means of the buttons 16, the studs of which intersect said supports and the heads of which support said races centrally so that the latter are pivotally mounted upon said supports and consequently also the platen and intermediate mechanisms supported upon said supports, suitable spot faces 16' being provided in supports 8, 9, 10 and 11 to receive said buttons. The lower series of bearing rolls 13 comprising four sets of such rolls are carried in the lower races 17, lower bearing race plates 12 connected each by six screws 12' to the bottom of the platen 2 being provided, as plainly shown in Figs. 2 and 3. The upper bearing race plates are also connected to the platen 2, said connection being at an angle of approximately 45 degrees and with three screws 14' as plainly shown in said Figs. 2 and 3, the upper series of bearing rolls 13 being contained upon said upper bearing race plates 14, and intersecting upper races 18 which are intermediate of said upper bearing rolls 13 and the guide blocks 4, 5, 6 and 7, as plainly shown in Fig. 3, the connection between said races 18 and said guide blocks being a pivotal one by means of the buttons 15, as plainly shown in said Fig. 3, spot faces 15' being provided in said guide blocks 4, 5, 6 and 7, to receive said buttons.

It will be apparent from the above description that when the proper alinement of the welding heads 3 and 3', that is, the proper alinement of the clamping jaws which hold the two members to be welded, has been secured, that the manually operable mechanism for moving the welding head 3 toward the welding head 3' is then used, such action effecting the movement of the platen 2 longitudinally of the main frame 1 upon the upper and lower series of bearing rolls 13.

Now, in order to effect the proper vertical alinement of the two parts to be welded, the screws 8³ and 9³ are loosened and through the medium of the adjusting screws 8², the race supports 8 and 9 are raised or lowered as desired, elongated holes being provided for the screws 8', as hereinbefore mentioned and as plainly shown in Fig. 3, whereupon the screw 8³ can then be tightened to hold the parts in the desired position. In order to effect the transverse horizontal alinement desired, the adjusting guide blocks 6 and 7 are tightened or loosened, through the medium of screws 6² and 7², elongated holes 6' and 7' for the screws 6 and 7 being provided for this purpose, as is plainly shown in Fig. 2. It is evident that by reason of the upper series of bearing rolls 13 being positioned at the angle shown relatively to platen 2, the respective parts will tighten up laterally, or both vertically and horizontally. It is also evident that by means of the provision of the upper and lower buttons 15 and 16, the parts automatically will aline themselves in the desired positions necessary to compensate for greater wear upon some surfaces than upon others.

A further feature of my improved mechanism is the provision of bearing surfaces which will not be affected by the injurious hot particles flying from the welding area. This is effected by means of providing bearing rolls by which the longitudinal movement of platen 2 is effected, in between or around which rolls such particles cannot enter, or if so, they will be quickly discharged or be not injurious. This is not true of previous devices wherein the surfaces upon which the movable member is reciprocated longitudinally of the frame have finished bearing surfaces to which hot particles easily obtain access and within which they are held to the great damage of such surfaces, the latter of course being highly finished and very subject to such damage. I have also provided means 1' upon the main frame 1 whereby most of such particles are discharged from the machine without affecting any portion thereof, such provision being made by hollowing out or sloping the portions 1' of said frame, as is plainly shown in Figs. 2 and 4. By the provision of these surfaces, most of the flying particles are discharged from the machine and entirely cleared from the same without any damage to any portion thereof. Also, as previously mentioned, the transverse central aperture 3⁶ is provided between the solid members 3² and 3⁴. Furthermore, the block 5 is so designed that it does not touch the platen 2 at any point so that by reason of the clearance thus created, the platen 2 during its movement rubs upon no part of the inner surface of the block 5 and hence if any sparks alight on the upper surface of the platen 2, they are not dragged back into the roller bearings. The same facts apply to block 6 and platen 2.

What I claim is:—

1. In apparatus for welding by electricity, the combination of a suitable frame and a frame-member; coöperating welding heads mounted thereon, respectively; bearing surfaces disposed intermediately said frame and frame-member and at an angle thereto; and means for relatively moving said frame and frame-member, said angularly disposed bearings providing both vertical and horizontal relative adjustment of said frame and frame-member when relatively moved.

2. In apparatus for welding by electricity, the combination of a frame; a welding head fixedly mounted longitudinally of said frame; a platen supported upon said frame and movable longitudinally thereof; a second welding head mounted upon said platen; bearing surfaces provided in said frame and disposed angularly relatively thereto and upon which said platen is movable, said surfaces being oscillatorily mounted; means for moving said platen upon said surfaces; and further means for relatively moving said frame and platen, said angularly disposed bearing surfaces providing both vertical and horizontal relative adjustment of said frame and platen when relatively moved by said last-named means.

3. In apparatus for welding by electricity, the combination of a frame; a welding head fixedly mounted longitudinally of said frame; a platen supported upon said frame and movable longitudinally thereof; a second welding head mounted upon said platen; bearing surfaces provided in said frame and upon which said platen is movable, said surfaces being oscillatorily mounted; means for adjusting said platen and bearing surfaces vertically; means for adjusting said platen and bearing surfaces transversely of said frame; and means for moving said platen upon said surfaces.

4. In apparatus for welding by electricity, the combination of a fixed frame and an adjustable frame; means for effecting such adjustment; coöperating welding heads mounted upon said fixed and adjustable frames, respectively, and relatively movable, in addition to said adjustment, to effect the welding operations; bearings angularly mounted relatively to said adjustable frame and upon which said welding movements are effected; and means for effecting said movements.

5. In apparatus for welding by electricity, the combination of a fixed frame and an adjustable frame; means for effecting such adjustment; coöperating welding heads mounted upon said fixed and adjustable frames, respectively, and relatively movable; two series of roller bearings upon which said relative movements are effected, one of said series being mounted angularly relatively to said adjustable frame; and means for effecting said relative movements.

6. In apparatus for welding by electricity, the combination of a fixed frame and an adjustable frame; means for adjusting the latter vertically; means for adjusting the same transversely; coöperating welding heads mounted upon said fixed and adjustable frames, respectively, and relatively movable; two series of roller bearings upon which said relative movements are effected, one of said series being mounted angularly relatively to said adjustable frame; and means for effecting said relative movements.

7. In apparatus for welding by electricity, the combination of a suitable frame; coöperating welding heads mounted thereon and relatively movable; and means for effecting said movements, said frame being provided with sloping surfaces immediately adjacent the welding area.

8. In apparatus for welding by electricity, the combination of a suitable frame; coöperating welding heads mounted thereon and relatively movable; bearing surfaces provided in said frame upon which said relative movements are effected; and means for effecting said movements, said frame being provided with sloping surfaces immediately adjacent the welding area.

9. In apparatus for welding by electricity, the combination of a suitable frame; coöperating welding-heads mounted thereon and relatively movable; roller-bearings mounted in said frame upon which said relative movements are effected; and means for effecting said movements, said frame being provided with sloping surfaces immediately adjacent the welding area.

10. In apparatus for welding by electricity, the combination of a suitable frame; coöperating welding heads mounted thereon and relatively movable; and means for effecting such relative movements, said frame being formed with a vertical aperture below and adjacent the welding area.

11. In apparatus for welding by electricity, the combination of a suitable frame; coöperating welding heads mounted thereon and relatively movable; roller bearings mounted in said frame upon which said relative movements are effected; and means for effecting said movements, said frame being formed with a vertical aperture below and adjacent the welding area.

12. In apparatus for welding by electricity, the combination of a frame; a welding-head fixedly mounted longitudinally of said frame; a platen supported upon said frame and movable longitudinally thereof; a second welding-head mounted upon said platen; race-supports and roller-bearings mounted in said frame and upon which said platen is movable, said race-supports and bearings being oscillatorily mounted; means for adjusting said platen, race-supports and bearings vertically; means for adjusting said platen, race-supports and bearings transversely of said frame; and means for moving said platen upon said rollers.

13. In apparatus for welding by electricity, the combination of a frame; a welding-head fixedly mounted longitudinally thereof; a platen supported upon said frame and movable longitudinally thereof; a second welding-head mounted upon said platen; vertically-adjustable members of said frame upon which said platen is mounted; race-supports and roller-bearings mounted in said frame upon which said platen rests, said supports and bearings being oscillatorily mounted; means for adjusting said platen transversely of said frame; and means for moving the same longitudinally thereof on said rollers.

14. In apparatus for welding by electricity, the combination of a main frame; a welding-head fixedly mounted longitudinally thereof; guide-blocks adjustable transversely of said frame; frame-members adjustable vertically of said frame; a platen movable longitudinally of the latter and supported by and intermediately of said blocks and frame-members; a second welding head mounted upon said platen; race-supports and bearings mounted intermediately of said platen and said blocks and frame-members, respectively, upon which the longitudinal movement of said platen is effected; and means for effecting said longitudinal movement.

15. In apparatus for welding by electricity, the combination of a main frame; a welding head fixedly mounted longitudinally thereof; guide blocks adjustable transversely of said frame; frame members adjustable vertically of said frame; a platen movable longitudinally of the latter and supported by and intermediately of said blocks and frame members; a second welding head mounted upon said platen; bearing surfaces provided intermediately of said platen and said blocks and frame members, respectively, upon which the longitudinal movement of said platen is effected; and means for effecting said longitudinal movement.

16. In apparatus for welding by electricity, the combination of a main frame; a welding-head fixedly mounted longitudinally thereof; guide-blocks adjustable transversely of said frame; frame-members adjustable vertically of said frame; a platen movable longitudinally of the latter and supported by and intermediately of said blocks and frame-members; a second welding head mounted upon said platen; race-supports and bearings mounted intermediately of said platen and said blocks and frame-members, respectively, upon which the longitudinal movement of said platen is effected, the race-supports and bearings intermediately of said platen and said blocks being mounted angularly relatively thereto; and means for effecting the longitudinal movement of said platen.

17. In apparatus for welding by electricity, the combination of a suitable frame; a frame-member relatively movable thereto to effect the welding operation; means for effecting such relative movement; coöperating welding heads mounted on said frame and frame-member, respectively; bearing surfaces disposed intermediately said frame and frame-member and at an angle thereto; and means for moving said frame and frame-member relatively vertically, said angularly disposed bearing surface providing for both vertical and horizontal relative adjustments of said frame and frame-member when moved relatively vertically.

18. In apparatus for welding by electricity, the combination of a suitable frame; a frame-member relatively movable thereto to effect the welding operation; means for effecting such relative movement; coöperating welding heads mounted on said frame and frame-member, respectively; bearing surfaces disposed intermediately of said frame and frame-member and at an angle to the latter; and means for moving said frame and frame-member relatively horizontally, said angularly disposed bearing surfaces providing for both vertical and horizontal relative adjustments of said frame and frame-member when moved relatively horizontally.

19. In apparatus for welding by electricity, the combination of a suitable frame; a frame-member relatively movable thereto to effect the welding operation; means for effecting such relative movement; coöperating welding heads mounted on said frame and frame-member, respectively; bearing surfaces disposed intermediately of said frame and frame-member and at an angle thereto; means for moving said frame and frame-member relatively vertically; and means for moving the same relatively horizontally, said angularly disposed bearing surfaces providing for both vertical and horizontal relative adjustments of said frame and frame-member when moved relatively either vertically or horizontally.

20. In apparatus for welding by electricity, the combination of a frame; a welding-head fixedly mounted longitudinally of said frame; guide-blocks mounted in said frame; a platen mounted in said guide-blocks; a second welding-head mounted upon said platen; a pair of race-supports and roller-bearings mounted in and intermediately of said guide-blocks and platen, respectively, said race-supports being oscillatorily mounted in said guide-blocks, buttons for providing said oscillatory mounting; spot-faces in said blocks for receiving said buttons, said races and bearings being contained between inclined surfaces of said blocks and platen; vertically-adjustable frame-members supporting said platen; a pair of race-supports and roller-bearings intermediate said frame-members and said platen, said race-supports being oscillatorily mounted upon said frame-members; means for adjusting said guide-blocks and platen transversely of said frame; and means for moving said platen upon said roller-bearings longitudinally of said frame.

21. In apparatus for welding by electricity, the combination of a suitable frame; a welding-head fixedly mounted longitudinally thereof; a second welding-head mounted so as to be reciprocable longitudinally of said frame; two pairs of longitudinal race-supports mounted in said frame and passing beneath said fixed welding-head, said race-supports being provided with roller-bearings, one pair of said race-supports being angularly positioned relatively to said frame; a movable platen mounted upon said rollers carrying said reciprocable welding-head, and extending beneath said fixed head, frame members for supporting said platen, race-supports and roller-bearings, all of the latter being oscillatorily mounted upon said members, some of said members being vertically adjustable; and means for adjusting said platen transversely of said frame.

Signed by me, this 29th day of January, 1917.

WILLIAM H. SPIRE.